United States Patent [19]
Gierke et al.

[11] Patent Number: 5,449,712
[45] Date of Patent: Sep. 12, 1995

[54] ORGANOSILICON EMULSIONS FOR RENDERING POROUS SUBSTRATES WATER REPELLENT

[75] Inventors: Mark A. Gierke; Christine L. Vidal, both of Lincoln, Nebr.; Michael E. Wilson, Middleburg, Fla.

[73] Assignee: Thoro System Products, Inc., Gainesville, Fla.

[21] Appl. No.: 3,636

[22] Filed: Jan. 13, 1993

[51] Int. Cl.$^6$ .......................... C08K 3/26; C08K 3/36; C08K 5/24; B01J 13/00
[52] U.S. Cl. ........................ 524/266; 106/2; 106/287.14; 106/287.16; 252/312; 427/377; 427/387; 427/393.4
[58] Field of Search .................. 252/312, 321; 106/2, 106/287.12, 287.14, 287.16; 524/806, 266

[56] References Cited

U.S. PATENT DOCUMENTS

| | | | |
|---|---|---|---|
| Re. 33,759 | 12/1991 | DePasquale et al. | 106/2 |
| 2,398,672 | 4/1946 | Sauer | 528/12 |
| 2,676,182 | 4/1954 | Daudt et al. | 106/287.14 |
| 2,736,721 | 2/1956 | Dexter | 525/475 |
| 2,857,356 | 10/1958 | Goodwin, Jr. | 428/268 |
| 3,772,065 | 11/1973 | Seiler | 106/2 X |
| 4,159,206 | 6/1979 | Armbruster et al. | 106/287.34 X |
| 4,175,159 | 11/1979 | Raleigh | 428/405 |
| 4,342,796 | 8/1982 | Brown et al. | 427/136 |
| 4,423,095 | 12/1983 | Blizzard | 524/588 X |
| 4,433,013 | 2/1984 | Pühringer | 427/327 |
| 4,435,219 | 3/1984 | Greigger | 106/287.12 X |
| 4,517,375 | 5/1985 | Schmidt | 556/463 |
| 4,525,213 | 6/1985 | Linn | 106/2 |
| 4,525,502 | 6/1985 | Traver | 524/96 |
| 4,582,874 | 4/1986 | Grape et al. | 524/588 |
| 4,690,713 | 9/1987 | Terae et al. | 106/287.12 X |
| 4,707,531 | 11/1987 | Shirahata | 528/12 |
| 4,717,599 | 1/1988 | Merrill | 427/387 |
| 4,814,017 | 3/1989 | Yoldas et al. | 106/287.14 X |
| 4,877,654 | 10/1989 | Wilson | 427/387 |
| 4,990,377 | 2/1991 | Wilson | 427/387 |
| 5,037,873 | 8/1991 | Heaton | 524/267 |
| 5,080,828 | 1/1992 | Terae | 252/358 |
| 5,091,002 | 2/1992 | Schamberg et al. | 106/2 |
| 5,226,954 | 7/1993 | Suzuki | 106/2 |
| 5,302,683 | 4/1994 | Weidner et al. | 106/287.12 X |

FOREIGN PATENT DOCUMENTS

| | | | |
|---|---|---|---|
| 0130521 | 1/1985 | European Pat. Off. | 106/287.14 |
| 60-127371 | 7/1985 | Japan | 524/806 |

OTHER PUBLICATIONS

ASTM, Designation: E 514-90, "Standard Test Method for Water Penetration and Leakage Through Masonry", pp. 409-412.

*Primary Examiner*—Richard D. Lovering
*Attorney, Agent, or Firm*—Hedman, Gibson & Costigan

[57] ABSTRACT

There are provided aqueous emulsions useful for rendering porous substrates water repellent comprising
a) a hydrolyzable silane and/or siloxane, b) an organopolysiloxane resin consisting of $R_3SiO_{0.5}$ siloxane units and $SiO_2$ siloxane units, or $R_3SiO_{0.5}$ units, $R_2SiO$ units, and $SiO_2$ siloxane units,
c) a filler having a surface area of at least 40 $m^2/g$,
d) an emulsifying agent, and
e) water.

Such compositions are especially useful on masonry exposed to wind-driven rain.

23 Claims, No Drawings

ORGANOSILICON EMULSIONS FOR RENDERING POROUS SUBSTRATES WATER REPELLENT

FIELD OF THE INVENTION

This invention relates to organosilicon emulsions which are especially useful for rendering porous substrates water repellent. More particularly, the present invention relates to emulsions of silanes or siloxanes with organopolysiloxane resins and colloidal silica useful for treating porous masonry and wood surfaces to render such surfaces water repellent. These compositions are especially useful for blocking the ingress of wind-driven rain into porous substrates such as brick, block, masonry, concrete or wood.

BACKGROUND OF THE INVENTION AND PRIOR ART

The utility of silanes, especially alkoxysilanes, as masonry water repellents is widely known. Compositions currently in use employ solutions of silanes in various organic solvents such as alcohol, e.g., U.S. Pat. Nos. 3,772,065 to Seiler and 4,342,796, to Brown et al., or hydrocarbons, e.g., Linn 4,525,213.

Aqueous silane compositions which are non-toxic and non-flammable have become important as effective masonry water repellent compositions, see U.S. Pat. Nos. 4,433,013 to Puhringer, 4,517,375 to Schmidt, 4,648,904 to DePasquale and Wilson (Re. 33,759), 4,877,654 to Wilson, 4,990,377 to Wilson, and 5,037,873 to Heaton. Aqueous siloxane compositions have also been used as masonry water repellents, see, U.S. Pat. Nos. 4,582,874 to Grape et al., and 5,091,002 to Schamberg et al.

While the performance of such aqueous compositions has been excellent in static water immersion tests with concrete cubes (see NCHRP No.244), they do not perform well in wind-driven rain tests such as ASTM E514-90. In such testing the pressurized water penetrates the water repellent outer layer of the masonry and seeps through.

Organopolysiloxane resins in solvent solutions have long been used for rendering masonry water repellent, see, U.S. Pat. Nos. 2,574,168 to Brick, 2,683,674 to Hafeber and Bunnell, 2,810,704 to Krantz, and 4,717,599 to Merrill. More recently water based organopolysiloxane resin emulsions for masonry water repellents have been developed, see, U.S. Pat. Nos. 4,175,159 to Raleigh, 4,525,502 to Traver, and 4,582,874 to Grape et al. A hydrophobic Silica was preferred in these formulations.

Organopolysiloxane resins are noted for their weatherability and they give an excellent water beading effect on masonry. Their drawbacks include a susceptibility to alkaline attack in concrete (esp. methylpolysiloxanes), relatively poor performance in static water immersion tests, and reduced permeability to moisture vapor versus organosilane and organosiloxane treatments. Also many substrates are discolored or darkened when they are treated with relatively low levels of some organopolysiloxane resins and organopolysiloxane oils.

Colloidal silica and fumed silica impart little or no sustained water repellency to masonry or wood, but when used in conjunction with other water repellents, they increase the stability of the formulations and/or improve the water beading characteristics of the treated masonry or wood, see, U.S. Pat. No. 4,209,432 to Roth.

Recent water based formulations containing colloidal silica have been reported in U.S. Pat. Nos. 5,037,873 to Heaton and 5,091,002 to Schamberg, et al. A hydrophobic silica was preferred in these formulations.

It has now been found that water based formulations comprising hydrolyzable silanes and/or oligomers thereof, and/or organosiloxanes, in further combination with organopolysiloxane resins, and colloidal dispersions of filler particles, exhibit high effectiveness in retarding water penetration and leakage through porous substrates, particularly masonry. Testing reported hereinafter has shown that the time for pressure-driven water to penetrate masonry walls treated with the compositions of the present invention is vastly increased in comparison with walls treated with the compositions of the prior art, and further that the amount of water absorbed by the masonry treated with the compositions of this invention is greatly reduced.

SUMMARY OF THE INVENTION

It is a principal object of the present invention to provide compositions and methods for rendering porous materials water repellent.

It is a further object of the present invention to provide compositions and methods for increasing the water penetration time and retarding water absorption of porous materials subjected to pressure-driven water, e.g., wind-driven rain.

Still another object of the present invention is to provide compositions and methods for imparting to cement and concrete compositions the ability to cure and produce masonry articles exhibiting increased penetration time and retarded water absorption after being subjected to pressure-driven water.

These and other objects are achieved according to the present invention by provided aqueous emulsions useful as porous substrate water repellent compositions, comprising a) a hydrolyzable silane and/or siloxane;
b) an organopolysiloxane resin;
c) a filler having a surface area of at least 40 m$^2$/g;
d) at least one emulsifier; and
e) water.

In two of its embodiments, the present invention also provides (i) a process for increasing the resistance to penetration by aqueous media of a porous substrate by applying to the surface of the substrate an emulsion as defined above and allowing the composition to cure; and (ii) a process for increasing the resistance to penetration by aqueous media of a porous substrate by applying to the composition from which the substrate is made an emulsion as defined above and allowing the composition to cure.

Special mention is made of embodiments of this invention comprising compositions and use of such compositions as defined above, wherein they also include effective amounts of f) buffers or g) biocides.

Especially preferred compositions of the present invention are aqueous emulsions comprising:

(a)(i) a hydrolyzable silane or a mixture of hydrolyzable silanes of the formula $R^1_n Si(R^2)_{4-n}$ wherein $R^1$ is a $C_1$–$C_{30}$ hydrocarbyl or halogenated hydrocarbyl group, $R^2$ is $C_1$–$C_6$ alkoxy, halide, amino, carboxyl, or a mixture of the foregoing and n is 1 or 2, (a)(ii) a hydrolyzable siloxane or mixture of hydrolyzable siloxanes of the formula

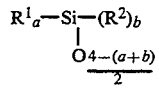

wherein $R^1$ and $R^2$ are as defined for (a)(i), a=0.8 to 2, and b≦2, or (a)(iii) a mixture of (a)(i) and (a)(ii), the total amount of (a)(i)+(a)(ii) in the composition being from about 0.5 to about 60 percent by weight;

(b) an organopolysiloxane resin selected from the group consisting of resins containing $R^3{}_3SiO_{0.5}$ units and $SiO_2$ units, the ratio of $R^3{}_3SiO_{0.5}$ units to $SiO_2$ units ranging from about 0.2 to about 1.2:1, and resins containing $R^3{}_3SiO_{0.5}$ units $R^3{}_2SiO$ units, and $SiO_2$ units, the ratio of $R^3{}_3SiO_{0.5}$ units to $SiO_2$ units ranging from about 0.2 to about 12:1 and the ratio of $R^3{}_2SiO$ units to $SiO_2$ units being up to about 0.1:1; where each $R^3$ is independently selected from a substituted or unsubstituted alkyl radical, an aryl radical, an alkaryl radical, an aralkyl radical, a cycloalkyl radical, an alkenyl radical or a mixture of any of the foregoing, the amount of the organopolysiloxane resin in the composition being from about 0.5 to about 45 percent by weight;

(c) A filler having a surface area of at least 40 m²/g; the amount of filler in the composition is from about 0.01 to about 3 percent by weight;

(d) an emulsifier or mixture of emulsifiers; and (e) water.

DETAILED DESCRIPTION OF THE INVENTION

By the term "masonry" used herein, is meant any porous inorganic substrate, particularly building compositions and including but not limited to structural ceramics such as common brick, paving brick, face brick, sewer pipe, drain tile, hollow block, terra cotta, conduits, roofing tile, flue lining, cements such as Portland cement, calcined gypsum products, i.e., molding and building plaster and stucco, magnesia cement, insulation products such as electrical and thermal insulators (diatomaceous earth brick) and porcelain spark plugs, etc.

The masonry materials also include stone, tile, artificial stone, adobe, concrete and reinforced concrete such as found in roadways, bridge decks, airport runways, parking garage decks, and other concrete building structures.

The masonry materials which can be treated in accordance herewith are preferably dry when treated with the water repellent compositions, although they may be wet. In the case of settable masonry materials, the compositions of the present invention may be incorporated in the preset mixture, for example, into a concrete mix prior to casting and setting. Wood, structural timbers, siding and the like can also be made water repellent using this invention.

Hydrolyzable Silane and/or Siloxane (a). The water-based compositions of the present invention preferably include as component (a) a hydrolyzable silane and/or siloxane. Such silanes (a)(i) have, for example, molecular weights up to about 600 (or essentially a multiple thereof, if oligomerized) and the general formula of $R^1{}_n-Si-(R^2)_{4-n}$, wherein $R^1$ is a $C_1-C_{30}$ hydrocarbyl or halogenated hydrocarbyl group, $R^2$ is a $C_1-C_6$ alkoxy, halide, amino, carboxyl, or a mixture of any of the foregoing, and n is 1 or 2. The hydrocarbyl group comprises hydrogen and carbon atoms and may be aliphatic, or cycloaliphatic, or aryl, or aralkyl. These hydrocarbyl radicals may also contain as substituent groups, halogen, e.g., chlorine, bromine, fluorine; nitrogen; oxygen or sulfur heteroatoms. One or more of such halogen substituents may be present in the $R^1$ group. The $R^2$ group can comprise $C_1-C_6$ alkoxy, halogen, amino, or carboxylate group. Thus, among the alkoxy groups useful as $R^2$ are methoxy, ethoxy, n-propoxy, and isopropoxy. As indicated, n may be 1 or 2 and thus, monohydrocarbyl substituted alkoxysilanes and dihydrocarbyl substituted alkoxysilanes are contemplated by the present invention. The active ingredients of the invention can also comprise condensation dimers and trimers, or other oligomers of the silanes as are well known in the art. The hydrolyzable silanes (a) can range widely in amount. However, typically the amount can comprise from about 0.5 to about 60 percent by weight of the composition, and especially from about 2.5 to about 40 percent by weight.

Silanes especially useful in accordance with the present invention generally have a molecular weight in excess of 135 and preferably greater than 190 up to about 600 for the monomers. The dimers and trimers present in the composition will, of course, have essentially multiples of the molecular weights of the single specie of silane or silanes being used. Typically, the silane comprises a compound of the general formula $R^1{}_nSi(R^2)_{4-n}$ wherein $R^1$ is $C_1-C_{30}$ hydrocarbyl or halogenated hydrocarbyl, $R^2$ is $C_1-C_6$ alkoxy, halide, amino, carboxyl or a mixture of any of the foregoing and n is 1 or 2, or an oligomer of said compound, especially one wherein $R^1$ comprises a $C_1-C_{10}$ group, $R^2$ comprises a $C_1-C_3$ alkoxy group and n is 1. Preferably, the silane comprises an alkylalkoxysilane, more preferably, an alkyltrialkoxysilane. Preferably, the concentration of the silane (a) comprises from about 2.5 to about 40 percent by weight and the organopolysiloxane resin (b) is present in an amount of from about 2.5 to about 30 percent by weight of the composition. It should be noted that mixtures of various silanes may be used, if desired.

Specific examples of silanes useful in accordance with the present invention include, but are not limited to methyltrimethoxysilane, methyltriethoxysilane, methyltri-n-propoxysilane, ethyltrimethoxysilane, ethyltriethoxysilane, dimethyldimethoxysilane, dimethyldiethoxysilane, ethyltri-n-propoxysilane, propyltriethoxysilane, propyltri-n-propoxysilane, butyltrimethoxysilane, butyltriethoxysilane, dibutyldimethoxysilane, isobutyltrimethoxysilane, di-isobutyldimethoxysilane, isobutyltriethoxysilane, n-hexyltrimethoxysilane, n-hexyltriethoxysilane, 6,6,6-trifluorohexyl-trimethoxysilane, cyclohexyltrimethoxysilane, benzyltrimethoxysilane, 4-chlorobenzyltriethoxysilane, 4-chlorobenzyltriethoxysilane, 4-bromobenzyltri-n-propoxysilane, phenyltrimethoxysilane, phenyltriethoxysilane, 3,3,4,4,5,5,6,6,7,7,8,8,8-tridecafluorooctyltriethoxysilane, 2,4,4-trimethylpentyltrimethoxysilane, octyltrimethoxysilane, octyltriethoxysilane, octyltriisopropoxysilane, 2-ethylhexyltrimethoxysilane, 4-chlorobenzyltrimethoxysilane, decyltrimethoxysilane, dodecyltrimethoxysilane, dodecyltribromosilane, tetradecyltriethoxysilane, hexadecyltriethoxysilane, octadecyltriethoxysilane, eicosyltrimethoxysilane, and the like, mixtures of any of them and the like, alone, and in admixture with dimers, trimers and other oligomers thereof. Special mention is made of compositions wherein the silane is octyltriethoxysilane.

Hydrolyzable Siloxanes (a)(ii). Useful in this invention are preferably organopolysiloxanes of the general formula

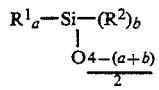

wherein $R^1$ is $C_1$–$C_{30}$ hydrocarbyl or halogenated hydrocarbyl, $R^2$ is $C_1$–$C_6$ alkoxy, halide, amino, carboxyl or a mixture of any of the foregoing, $a=0.8$ to 2 and $b \leq 2$.

Mixtures of various siloxanes may be used if desired. Also, mixtures of silanes (a)(i) and siloxanes (a)(ii) may be used.

Specific examples of hydrolyzable siloxanes useful in accordance with the present invention are methyl silsesquioxane, ethoxy-terminated; methyl silsesquioxane, methoxy-terminated; iso-butyltrimethoxysilane oligomer; octyltriethoxysilane oligomer; iso-octyltrimethoxysilane oligomer; 3,3,3-trifluoropropyltrimethoxysilane oligomer; and 3,3,4,4,5,5,6,6,7,7,8,8-tridecafluorooctyltriethoxysilane oligomer.

The preparation of emulsions containing such siloxanes is described in U.S. Pat. Nos. 4,582,874 to Grape and 5,091,002 to Schamberg. Especially preferred are siloxanes where $R^1$ is $C_1$–$C_{10}$ hydrocarbyl, $R^2$ is $C_1$–$C_3$ alkoxy, a is about 1, and $b=0.2$ to 2.

Organopolysiloxane Resin (b). Preferably these are selected from the group consisting of resins containing $R^3{}_3SiO_{0.5}$ units and $SiO_2$ units the ratio of $R^3{}_3SiO_{0.5}$ units to $SiO_2$ units ranging from about 0.2 to about 1.2 (herein referred to as MQ resins), preferably from about 0.6 to about 1.0:1 and resins containing $R^3{}_3SiO_{0.5}$ units $R^3{}_2SiO_2$ units, and $SiO_2$ units, the ratio of $R^3{}_2SiO$ units to $SiO_2$ units being up to about 0.1:1 (herein referred to as MDQ resins) where each $R^3$ is independently selected substituted or unsubstituted alkyl radical, aryl radical, alkaryl radical, aralkyl radical, cycloalkyl radical or alkenyl radical. Preferably, substantially all of the R groups are methyl. It is to be understood that the present invention contemplates the use of blends of different organopolysiloxane resins in the present emulsions as well as the use of a single type resin for each emulsion.

Methods for preparing such organopolysiloxane resins are well known in the art, for example as described in U.S. Pat. Nos. 2,398,672 to Sauer, 2,676,182 to Daudt et al., 2,736,721 to Dexter, 2,857,356 to Goodwin, Jr., and 4,707,531 to Shirahata, all of which are incorporated by reference into the present disclosure. Other methods for preparing resins of this type will be apparent to those of ordinary skill in the art.

Generally, the MQ and MDQ resins employed in the practice of the invention are provided as a solution in an organic solvent such as xylene or toluene, and typically as a 40 to 60 percent by weight solution. While the organic solvent from the resin preparation may be incorporated in the emulsions of the present invention, it is preferred to remove the solvent from the silane/siloxane/organopolysiloxane resin solution prior to emulsification. Removal of the organic solvent results in an emulsion with lower volatile organic compounds (VOC's) on curing. It is preferred that the organopolysiloxane resins (MQ and MDQ) be soluble in the silane/-siloxane oil phase, but this is not essential. Solubility may be achieved by adding a water-immiscible organic solvent to the oil phase mixture.

The amount of MQ or MDQ resin utilized in the present invention will be from 0.5 to 45% based on the weight of the total emulsion composition. The preferred range is about 2.5% to 30%. It should be noted that mixtures of various MQ and MDQ resins may be used, if desired. Examples of suitable commercially available such resins are PCR Group Inc.'s MQOH-1, Dow Corning Corporation's Dow Corning® 1250 Surfactant, and General Electric Company's SS4255 Polysiloxane Resin, all of which are about 50 wt. % xylene solutions of MQ resins with a M/Q of about 0.75.

Fillers (c). Preferred examples of Fillers (c) having a surface area of at least 40 m$^2$/g, are pyrogenically produced silicon dioxide (fume silica), silicon dioxide aerogels, i.e. silicic acid hydrogels which have been dehydrated while maintaining their structure precipitated silicon dioxide having a surface area of at least 40 m$^2$/g other than silicon dioxide aerogels, and pyrogenically produced titanium dioxide. The surface area of the fillers is measured by means of nitrogen absorption as described in ASTM Special Technical Bulletin No. 51 (1941), page 95 and following. This method is generally referred to as "BET".

The fillers which have a surface area of at least 40 m$^2$/g may also have absorbed thereon or chemically bonded thereto, organic or organosilicon compounds or groups, such as organosiloxy groups, e.g., trimethylsiloxy or dimethylsiloxy groups. Fillers modified in this way can for example be prepared by reacting pyrogenically produced silicon dioxide or precipitated silicon dioxide having a surface area of at least 40 m$^2$/g, with organosilicon compounds which are capable of imparting hydrophobic properties thereto. Examples of suitable organosilicon compounds are trimethylethoxysilane or hexamethyldisilazane.

Mixtures consisting of various fillers having a surface area of at least 40 m$^2$/g may be employed, if desired. Preferably the fillers are colorless, in order to avoid undesired coloring of the building materials.

Especially preferred as fillers are aqueous colloidal dispersions of silica particles that are anionically stabilized. Examples of these silicas are the LUDOX® colloidal silicas supplied by Du Pont Company (Wilmington, Del.). Some care must be exercised when preparing silane/siloxane emulsions with these anionically stabilized silicas because they are typically supplied with a pH > 8.5, and some neutralization or buffering may be required to provide a pH where the silane/-siloxane will be essentially hydrolytically stable (see U.S. Pat. No. 4,877,645 to Wilson).

The amount of filler that is preferred for use in this invention is about 0.01 to 3% based on the total weight of the emulsion. Especially preferred concentrations are from 0.05 to 1% based on the total weight of the emulsion.

Substrates treated with emulsions of this invention that contain effective amounts of fillers show a surprising improvement in resistance to the ingress of wind driven rain. Hydrophobic fillers also impart an expected improvement in water beading. Hydrophilic fillers such as the aqueous colloidal silica dispersions are surprisingly effective at improving the water beading on treated substrates. Prior art examples have used hydrophobic fillers only.

Emulsifiers (d). A wide variety of ionic and nonionic emulsifiers have been tried and have been found to be useful in the present invention. Nonionic, anionic, cationic and amphoteric emulsifiers are well known from the state of the art. The preferred emulsifiers are, however, nonionic. The concentration of emulsifier or emulsifiers used in accordance with the present invention may range widely, but preferably is from about 0.5 to about 50 percent by weight of the silane/siloxane and especially preferably in the range from about 1 to about 8 percent by weight of the silane/siloxane. Based on the composition, the preferred concentration of the emulsifier is from about 0.1 to about 10 percent by weight of the composition.

In general, those emulsifiers or emulsifier blends which have an HLB in the range from about 1.5 to about 20, and preferably in the range from about 4 to about 17 may be used herein. The proper HLB value for a given silane/siloxane mixture must be determined experimentally in order to ascertain the optimum stability.

The HLB classification of surfactants is based on molecular structure and therefore can be used to predict the behavior of single molecules. HLB is determined experimentally by techniques known to those skilled in this art, for example, those set forth in the pamphlet "The HLB System" published by ICI Americans, Inc., Wilmington, Del., U.S.A. If the HLB of an emulsifier is below 1.5, it will not be useful in this invention because it will not produce a stable oil-in-water emulsion. If, on the other hand, the HLB is above 20, it also will not be useful because stability is poor. HLB values in the range of 4–17 are preferred because they provide the most stable emulsions of the above mentioned silanes and siloxanes.

Specific examples of emulsifying agents which may be used in accordance herewith include, but are not limited to the following with the HLB value given in parenthesis following the name: sorbitan trioleate (1.8), sorbitan tristearate (2.1), polyoxyethylene sorbitol hexastearate (2.6), glycerol monostearate (3.8), sorbitan monooleate (4.3), sorbitan monostearate (4.7), polyoxyethylene (2 mole) stearyl ether (4.9), sorbitan monopalmitate (6.7), polyoxypropylene mannitol dioleate (8), polyoxyethylene sorbitol oleate (9.2), polyoxyethylene stearate (9.6), polyoxyethylene sorbitan monooleate (10.0), polyoxyethylene monooleate (11.4), polyoxyethylene (6 mole) tridecyl ether (11.4), polyoxyethylene (10 mole) cetyl ether (12.9), polyoxyethylene sorbitan monooleate (15), polyoxyethylene (20 mole) stearyl ether (15.3), polyoxyethylene (15 mole) tridecyl ether (15.4), polyoxyethylene alkylamine (cationic, 15.5); polyoxyethylene alcohols having an HLB of 9.7, about 10, and 11.6; ethoxylated nonylphenols having HLB values of 10, 11 and 12; dialkylphenol ethoxylates having an HLB value of 10.6 and 19; block copolymers of ethylene oxide and propylene oxide having HLB values in the range of 5.5 to 15; ethoxylated octylphenols having an HLB of about 13.5, 17.3, and 17.9; fatty acid glycerides having HLB values of approximately 4, sodium lauryl sulfate, mixtures of any of the foregoing, and the like.

The preferred emulsifying agents, given in the table below, provide especially useful emulsions of silanes.

| TYPE OF SURFACTANT | EXAMPLES (SUPPLIER; HLB) |
|---|---|
| Polyoxyethylene alcohols | Brij 30 (ICI Americas; 9.7) |
| | Tergitol 15-S-3 (Union Carbide; approx. 10) |
| | Triton DF 16 (Rohm & Haas; 11.6) |
| Ethoxylated nonylphenols | NP-6 (Union Carbide; 11) |
| | NP-7 (Union Carbide; 12) |
| | CO-520 (GAF; 10) |
| Dialkylphenol ethoxylate | DM-530 (GAF; 10.6) |
| Block copolymers of ethylene oxide and propylene oxide | Pluronics (BASF) L42 (8), L62 (7), L64 (15) L72 (6.5), L92 (5.5), 25R2 (6.3) Tetronic 702 (BASF; 7) |
| Fatty acid glycerides | Arlacel 165 (ICI Americas; 4) |
| Sorbitan fatty acid esters | Spans (ICI Americas) 20 (8.6), 40 (6.7), 60 (4.7) 80 (4.3) |
| Polyoxyethylene sorbitan fatty acid eaters | Tween 61 (ICI Americas; 9.6) Tween 81 (ICI Americas; 10.0) |
| Blends of sorbitan esters with polyoxyethylene amines | Atlas G-1096 Atlas G-2090 (ICI Americas) |
| Amphoteric | Atlas G-271 (ICI Americas) |
| Polyvinyl alcohol | (Air Products and Chemicals, Inc.) |
| Blend of octylphenol polyoxyethylene ethanol | Triton X-100 and Triton X-305 (Rohm & Haas, about 15) |

Blending may be necessary, and desirable, if one of the emulsifiers, e.g., sodium lauryl sulfate, has an HLB outside the range of 1.5–20. Sodium lauryl sulfate, HLB about 40, will be blended with a low HLB material, illustrated above, for use.

Buffering Agent (f). An optional ingredient in these emulsions is a Buffering Agent (f) suitable for maintaining the pH of the emulsion in a range where the silane/siloxane is essentially hydrolytically stable. Preferred for the range is a pH of from about 6 to about 8.5.

Illustrative of buffering agents useful for these emulsions, especially those containing biocides are: organic and inorganic acids and bases, including salts thereof, and preferably mono- or poly-alkali metal, alkaline earth metal or amine salts of carbonic acid, phosphoric acid, sulfuric acid, hydrosulfuric acid, a $C_1$–$C_6$ organo-, mono- or poly-carboxylic acid, or a $C_2$–$C_{30}$ alkyleneiminopolycarboxylic acid, ammonia, a $C_1$–$C_{30}$ organic base, or a mixture of any of the foregoing. Preferred are alkali metal carbonates or -bicarbonates, or -phosphates or ammonia. Illustrative are: sodium bicarbonate, sodium carbonate, ammonium carbonate, sodium borate, mono-, di-, or trisodium phosphate, mono-, di, or tripotassium phosphate, ammonium sodium phosphate, mono-, or disodium sulfate, sodium acetate, potassium acetate, ammonium acetate, calcium acetate, sodium formate, mono-, or disodium sulfide, ammonia, mono-, di, or triethylamine, mono-, di-, or triethanolamine, (ethylenedinitrilo) tetraacetic acid sodium salt (sodium E.D.T.A.), pyridine, aniline, and sodium silicate. These are only a few examples of appropriate buffering agents. Combinations of these materials with other buffers, acids, or bases, such as the use of ammonium hydroxide and acetic acid together, will also be effective.

Trisodium phosphate ($Na_3PO_4$) and ammonium hydroxide ($NH_4OH$) are preferred, but sodium bicarbonate ($NaHCO_3$) is especially preferred because it is easy to handle; it consistently gives emulsions with a pH of 7.5; it is environmentally safe; and it is inexpensive.

The amount of buffering agent to be employed can vary widely. In general, however, less than 0.01 percent will not be enough to be useful, and more than 5 percent by weight of the total composition will be uneconomical.

Biocidal Agent (g). Optionally a Biocidal Agent (g) may be used. Any of those well known in the art for imparting antimicrobial and biocidal activity can be used in conventional amounts, e.g., from about 0.1 to about 5 percent by weight based on the composition. Suitable biocidal agents for these embodiments comprise 6-acetoxy-2,4-dimethyl-m-dioxane, sold by Givaudan Corp. under the trademark Giv-Gard DXN biocide, methyl p-methoxybenzoate, and the like. Typical concentrations of these biocides are 0.15 percent by weight.

In addition to biocides, the formulations of this invention may include other additives such as fragrances, colorants, thickeners, foaming agents, anti-foaming agents, polydimethylsiloxane oils, hydrocarbon waxes, mineral oils, chlorinated paraffins, metallic soaps, fungicides, light stabilizers, light absorbers, catalysts and the like.

The compositions of the present invention can be made and used by methods well known to those skilled in this art. The working examples which follow describe in detail methods to prepare stable emulsified compositions. They also show how to apply the compositions to porous masonry materials and to test them as water repellents, especially against conditions mimicking wind-driven rain. Methods for testing emulsion stability are also well-known and exemplified in the above-mentioned prior art.

DESCRIPTION OF THE PREFERRED EMBODIMENTS

The following examples illustrate the present invention but the claims are not to be construed as limited thereto. All parts are by weight.

Example 1

To a stirred mixture of 82.5 g of octyltriethoxysilane (PCR Group Inc.'s PROSIL® 9202), 85.0 g of a 50% xylene solution of organopolysiloxane resin of the approximate formula $(Me_3SiO_{0.5})_{0.7}(SiO_2)_{1.0}$ (MQ Resin Solution, e.g., PCR Group Inc.'s MQOH-1), and 1.8 g of ethoxylated octylphenol with an HLB of about 13.5 (Rohm and Haas TRITON® X-100) in a Ross mixer is gradually added 795 g of deionized water. When addition is complete, the mixture is stirred for 10 minutes before adding slowly with agitation 5.0 g of an aqueous dispersion containing 40% colloidal silica (Du Pont LUDOX® AS-40). Agitation is continued during the sequential addition of 3.60 g of ethoxylated octylphenol with an HLB of 17.3 (Rohm and Haas TRITON® X-305), 1.10 g of sodium bicarbonate, and 1.10 g of BUSAN® (biocide). The prehomogenized blend is subsequently passed through an APV Gaulin 15MR homogenizer at 8000 psi. The resulting milky emulsion is adjusted to the desired concentration by adding an additional 25 g of deionized water. The composition is summarized in Table 1. Emulsions prepared in this manner maintain a uniform milky appearance when stored at 25° C. for at least a month.

Comparison Examples 1A–E

Comparison emulsions with the omission of some active components are prepared in the same manner as for Example 1. The compositions are summarized in Table 1. Note that the "MQ Resin" values are for the amount of polysiloxane resin without xylene (e.g. 4.25% MQ Resin is obtained by adding 8.50% of a 50% MQ Resin Solution to the emulsion).

TABLE 1

Compositions of Examples I and 1A–E

| Component | 1 | 1A | 1B | 1C | 1D | 1E |
|---|---|---|---|---|---|---|
| Prosil® 9202 | 8.25% | 8.25% | 0% | 12.5% | 12.5% | 0 |
| MQ Resin | 4.25 | 4.25 | 12.5% | 0 | 0 | 12.5 |
| Ludox® AS-40 | 0.5 | 0 | 0 | 0 | 0.5 | 0.5 |
| Triton X-100 | 0.18 | | | → | | |
| Triton X-305 | 0.36 | | | → | | |
| Sodium Bicarbonate | 0.11 | | | → | | |
| Busan® 1024 | 0.11 | | | → | | |

The balance of the emulsions is water and possibly some xylenes from the MQ Resin Solution. Emulsions 1, 1A, 1C, and 1D are smooth, stable, milky emulsions. Emulsion 1B tends to leave a sticky residue on surfaces it contacts. Emulsion 1E is much more viscous than the others, and it becomes very viscous on standing overnight—some flocculation is observed.

The emulsions are applied to the surface of a pressure treated pine board at a rate of 250 ft$^2$/gal (6.2 m$^2$/l) and allowed to dry for 1 week. The water beading results are summarized in Table 2.

In a like manner the emulsions are applied to sandstone tile at a rate of 125 ft$^2$/gal (3.1 m$^2$/l) and allowed to dry for 1 week. The water beading results are summarized in Table 2.

The emulsions are applied to concrete patio blocks at a rate of 125 ft$^2$/gal (3.1 m$^2$/l) and allowed to dry for 1 week. The water beading results are summarized in Table 2.

The water beading effect is determined in the following manner. Several drops of tap water are carefully deposited on the horizontal test surface with a pipette. Observations are made continuously for the first 5 min., then at 2 hr., and again at 20 hr. The contact area of the water drops is evaluated visually and graded according to the following standards.

1 = no wetting of the contact area after 20 hr.
2 = the contact area appears dry at 2 hr., but it appears damp at 20 hr.
3 = the contact area appears dry at 5 min., but it appears damp at 2 hr.
4 = the contact area appears damp at 5 min.
5 = the water has partially soaked into the contact area within 5 min.
6 = the water has totally soaked into the contact area within about 5 min.
7 = the water has totally soaked into the contact area within about 1 min.
8 = the water has totally soaked into the contact area within about 5 sec.

TABLE 2

Water Beading Results on Various Substrates

| Substrate | 1 | 1A | 1B | 1C | 1D | 1E | Untrt |
|---|---|---|---|---|---|---|---|
| Wood | 5 | 5 | 3 | 6 | 6 | 3 | 7 |
| Tile | 3–4 | 5 | 3 | 5 | 4 | 3 | 8 |
| Concrete Block | 2 | 4 | 2 | 5 | 4–5 | 3 | 8 |

For performance testing, emulsions prepared as described in Example 1 and Comparative Examples 1A-E above are tested using concrete cubes in accordance with DePasquale and Wilson, U.S. Pat. No. 4,648,904 and Wilson, U.S. Pat. No. 4,877,654. Cement mortar cubes two inches on the side are conditioned in a control room at 73° F. and 50 percent relative humidity (RH) for 21 days to give a constant weight. Each composition to be tested for water repellency is applied to two cubes at the rate of 125 ft²/gal (3.1 m²/l), and the coated cubes are cured on a rack in a control room for 13 days prior to recording the initial weight of each cube. All of the cubes including two untreated control cubes are placed on a rack and immersed in a distilled water bath. After 21 days of immersion the cubes are removed, blotted dry and immediately weighed. The percent weight gain of each block is determined by $$\frac{W(\text{final}) - W(\text{initial})}{W(\text{initial})} \times 100 = \% \text{ Weight Gain}$$

The percent Reduction of Weight Gain is calculated by the formula $$100 \times \frac{(\% \text{ Weight Gain of Control}) - (\% \text{ Weight Gain of Sample})}{(\% \text{ Weight Gain of Control})} = \% \text{ Reduction of Weight Gain}$$

Higher Percent Reduction of Weight Gain indicates higher effectiveness as a porous material water repellent. Due to the variability of the mortar blocks, values for percent Reduction of Weight Gain have a precision of about plus or minus 5 percent.

The results of concrete water absorption of the aged emulsions are set forth in Table 3:

TABLE 3

Results-of Water Absorption of Treated Cement Cubes

|  | 1 | 1A | 1B | 1C | 1D | 1E |
|---|---|---|---|---|---|---|
| Reduction of Weight Gain, % | 90 | 82 | 22 | 71 | 72 | 14 |

The excellent Reduction of Weight Gain achieved using Example 1 is slightly better than Comparison Example 1A (prepared without the colloidal silica), significantly better than better than Comparison Examples 1C and 1D (prepared without the polysiloxane resin), and far superior to Comparison Examples 1B and 1E (prepared without the silane).

Wind driven rain tests with these emulsions are performed using a modified ASTM E514 procedure as follows:

One face of a solid 16 in. × 8 in. × 2 in. concrete block is treated with the test emulsion at a rate of 125 ft²/gal (3.1 m²/l). The surface is allowed to dry for at least 28 days at approx. 75° C. and 70% RH before it is mounted in the test chamber. Water is continuously sprayed at 25 psig pressure at the treated face of the block until water begins to flow down the back face of the block. The time is noted from the initiation of the water spray until the back face displays initial dampness, initial water beading, and initial water flow. At the end of the test the blocks are weighed to determine the weight of water absorbed. All samples are run in duplicate with an untreated control sample, and the average results are summarized in Table 4.

It is desired that the treatments should slow the ingress of wind driven rain, and thus higher values for Init. Dampness, Init. Bead, and Init. Flow show better performance. It is also desired that the block should absorb little water in the course of the test, and thus lower values for Weight Gain demonstrate better performance.

TABLE 4

Wind Driven Rain Results on Concrete Block

|  | 1 | 1A | 1B | 1C | 1D | 1E | Untreated |
|---|---|---|---|---|---|---|---|
| Init. Dampness (sec.) | 154 | 52 | 43 | 27 | 53 | 50 | 16 |
| Init. Bead (sec.) | 188 | 64 | 58 | 33 | 95 | 115 | 20 |
| Init. Flow (sec.) | 202 | 70 | 69 | 40 | 123 | 134 | 25 |
| Weight Gain (g) | 65 | 149 | 161 | 189 | 176 | 154 | 225 |

These results demonstrate the surprisingly better performance of Example 1 over Comparison Examples 1A-E in wind driven rain testing. A surprising synergetic effect from the combination of silane+polysiloxane resin+colloidal silica is observed.

Moisture vapor transmission of porous substrates treated with these emulsions was determined using a modified ASTM D-1653 procedure as follows:

An untreated, unbleached $8\frac{5}{8}'' \times 11\frac{1}{4}'' \times 20$ mil thick paper card (Leneta Co.) is saturated with the emulsion and hung to dry for at least 7 days. Two 3" circles are cut from the center of the sheet. The circles are mounted with a hermetic seal at the edges on the top of standard $2\frac{5}{8}''$ diameter, $\frac{3}{4}''$ deep cups ("Payne Cups") containing 10 g of deionized water in the bottom. The cups are weighed and placed in a desiccator containing anhydrous calcium sulfate (0–25% RH) at 73° F. (23° C.). The cups are weighed daily for a week and an average rate of moisture vapor transport (g/(m²×day)) is calculated. The results are summarized in Table 5.

TABLE 5

Moisture Vapor Transport Results

|  | 1 | 1A | 1B | 1C | 1D | 1E | Untreated |
|---|---|---|---|---|---|---|---|
| Rate of Moisture Vapor Transport, g/(m² × day) | 407 | 344 | 414 | 399 | 447 | 413 | 465 |
| Moisture Vapor Transport, % of untreated | 88 | 74 | 89 | 86 | 96 | 89 | 100 |

Even though Example 1 is highly effective at blocking wind driven rain, it still maintains a surprisingly high level of moisture vapor transport. In every case, the addition of the colloidal silica filler to the formulation results in either no change or a marked improvement in moisture vapor permeability (1 vs. 1A; 1E vs. 1B; 1D vs. 1c).

Example 2

To an agitated volume of 837 g of deionized water is slowly added 5.0 g of an aqueous dispersion containing 40% colloidal silica (Du Pont LUDOX ® AS-40). Agitation is continued during the sequential addition of 3.6 g of ethoxylated octylphenol with an HLB of about 17.3 (Rohm and Haas TRITON ® X-305), 1.1 g of sodium bicarbonate, and 1.1 g of BUSAN ® 1024 (biocide). This premixed aqueous phase is gradually added to a vigorously stirred mixture of 40 g of octyltriethoxysilane (PCR PROSIL ®9202), 85 g of a 50% octyltriethoxysilane solution of organopolysiloxane resin of the approximate formula $(Me_3SiO_{0.5})_{0.7}(SiO_2)_{1.0}$ (50% MQ Resin in PROSIL® 9202) and 1.8 g of ethoxylated octylphenol with an HLB of about 13.5 (Rohm and Haas TRITON® X-100).

The prehomogenized blend is subsequently passed through an APV Gaulin 15MR homogenizer at 8000 psi. The resulting milky emulsion is adjusted to the desired concentration by adding an additional 25 g of deionized water. This emulsion maintains its uniform milky appearance when stored at 25° C. for at least a month.

This emulsion is applied to a concrete patio block and allowed to dry for 1 week. The treated surface has an excellent water beading rating of 2. Since this emulsion is prepared without any xylene, it has a lower VOC level than Example 1.

Example 3

The emulsion is prepared as for Example 2, except 6-acetoxy-2, 4-dimethyl-m-dioxane biocide (Givaudan Corp. GIV-GARD® DXN biocide) is substituted for the BUSAN® 1024 biocide. The emulsion has identical performance to Example 2.

Example 4

To a stirred mixture of 70 g of 50% MQ Resin in octyltriethoxysilane (PROSIL® 9202), 2.0 g of TINUVIN® 1130 (Ciba-Geigy UV stabilizer), 0.5 g of TINUVIN® 292 (Ciba-Geigy UV Stabilizer), and 1.8 g of TRITON® X-100 surfactant is added a premixed blend of 5.0 g of LUDOX® AS-40 colloidal silica in 841 g of deionized water. Then 3.6 g of TRITON® X-305 surfactant and 1.1 g of sodium bicarbonate (buffering agent) are added and the mixture is vigorously agitated for 10 minutes. The rough emulsion is subsequently passed through a APV Gaulin 15MR homogenizer at 8000 psi to give a uniform milky emulsion.

The emulsion is applied to concrete patio block and a piece of pressure treated pine board and allowed to dry for 1 week. The treated surfaces have water bead ratings of 2 and 5, respectively.

Example 5

To a stirred mixture of 80 g of 50% MQ in octyltriethoxysilane (PROSIL® 9202), 40 g of octyltriethoxysilane (PROSIL® 9202), 1.8 g of TRITON® X-100 surfactant, and 1.5 g of GIV-GARD® DXN biocide is added a premixed blend of 807 g of deionized water, 3.6 g of TRITON® X-305 surfactant, and 1.1 g of sodium bicarbonate (buffering agent), and the mixture is vigorously agitated for 10 min. The rough emulsion is subsequently passed through a APV Gaulin 15MR homogenizer at 8000 psi to give a uniform milky emulsion. A mixture of 5.0 g of LUDOX® AS-40 colloidal silica in 60 g of deionized water is slowly stirred into the emulsion to provide the final composition.

The emulsion produces an excellent water bead on concrete. In the test described above it has a moisture vapor transmission level of 93% of the untreated control.

Example 6

To a stirred mixture of 75 g of 50% MQ in octyltriethoxysilane (PROSIL® 9202), 15 g of octyltriethoxysilane (PROSIL® 9202), 20 g of poly(ethylene-1,1,3,3-tetramethyldisiloxane) (100 cSt), 2.0 g of TINUVIN® 1130, 0.50 g of TINUVIN® 292, (UV-stabilizers) and 1.8 g of TRITON® X-100 (surfactant) is added a premixed blend of 826 g of deionized water, 5.0 g of LUDOX® AS-40 colloidal silica, 1.5 g of sodium bicarbonate buffer, and 3.6 g of TRITON® X-305 surfactant. The blend is homogenized as for Example 1 and diluted to the desired solids level with 25 g of deionized water.

The emulsion produces an excellent water bead on concrete. In the test described above it has a moisture vapor transmission level of 47% of the untreated control.

Examples 7–10

To a stirred mixture of 80 g of 50% MQ in octyltriethoxysilane (PROSIL® 9202), 1.8 g of an ethoxylated nonylphenol with an HLB of about 10.0 (Rohm and Haas TRITON® N-57 surfactant), and 1.5 g of GIV-GARD® DXN biocide is added a premixed blend of 802 g of deionized water, 3.6 g of TRITON® X-305, and 1.1 g of sodium bicarbonate (buffer). The blend is homogenized as for Example 1. A 70 g mixture of LUDOX® AS-40 colloidal silica in deionized water is slowly stirred into the emulsion to provide the final compositions which are summarized in Table 6.

TABLE 6

| Component | Compositions of Examples 7–10 | | | |
|---|---|---|---|---|
| | 7 | 8 | 9 | 10 |
| Prosil® 9202 | 8.0% | → | | |
| MQ Resin | 4.0% | → | | |
| Triton® N-57 | 0.18% | → | | |
| Triton® X-305 | 0.36% | → | | |
| GIV-GARD® DXN | 0.15% | → | | |
| Sodium Bicarbonate | 0.11% | → | | |
| Ludox AS-40 | 0.5% | 1.0% | 1.5% | 2.0% |

The balance of the emulsions is water.

Example 10 is extremely viscous after standing for 24 hours and no further testing is done.

The emulsions from Examples 7–9 are applied to concrete block, and all of them give a very good water bead after drying.

In the tests described above, the emulsion from Example 8 has a moisture vapor transmission level of 81% of the untreated control and Reduction of Weight Gain on cement cubes of 86% of the untreated control.

The above mentioned patents, publications, and test methods are incorporated herein by reference.

Many variations in the present invention will suggest themselves to those skilled in this art in light of the above, detailed description. All such obvious modifications are within the full intended scope of the appended claims.

We claim:

1. An aqueous emulsion composition comprising:
   (a) (i) a hydrolyzable silane or a mixture of hydrolyzable silanes of the formula $R^1{}_n Si(R^2)_{4-n}$ wherein $R^1$ is a $C_1$–$C_{30}$ hydrocarbyl or halogenated hydrocarbyl group, $R^2$ is $C_1$–$C_6$ alkoxy, halide, amino, carboxyl, or a mixture of the foregoing and n is 1 or 2,
   (a)(ii) a hydrolyzable siloxane or mixture of hydrolyzable siloxanes of the Formula

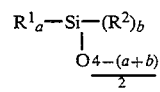

wherein $R^1$ and $R^2$ are as defined for (a)(i), a=0.8 to 2, and b≦2, or (a)(iii) a mixture of (a)(i) and (a)(ii), the total amount of (a)(i)+(a)(ii) in the composition being from about 0.5 to about 60 percent by weight;

(b) an organopolysiloxane resin selected from the group consisting of resins containing $R^3{}_3SiO_{0.5}$ units and $SiO_2$ units, the ratio of $R^3{}_2SiO_{0.5}$ units to $SiO_2$ units ranging from about 0.2 to about 1.2:1, and resins containing $R^3{}_3SiO_{0.5}$ units, $R^3{}_2SiO$ units, and $SiO_2$ units, the ratio of $R^3{}_3SiO_{0.5}$ units to $SiO_2$ units ranging from about 0.2 to about 1.2:1 and the ratio of $R^3{}_2SiO$ units to $SiO_2$ units being up to about 0.1:1; where each $R^3$ is independently selected from the group consisting of a substituted or unsubstituted alkyl radical, an aryl radical, an alkaryl radical, an aralkyl radical, a cycloalkyl radical, an alkenyl radical and a mixture of any of the foregoing, the amount of the organopolysiloxane resin in the composition being from about 0.5 to about 45 percent by weight;

(c) A filler having a surface area of at least 40 $m^2/g$; the amount of filler in the composition is from about 0.01 to about 3 percent by weight;

(d) an emulsifier or mixture of emulsifiers; and (e) water.

2. A composition as defined in claim 1 wherein said hydrolyzable silane (a)(i) has a molecular weight of up to about 600 and comprises a compound of the general formula $R^1{}_nSi(R^2)_{4-n}$ wherein $R^1$ is $C_1$-$C_{30}$ hydrocarbyl or halogenated hydrocarbyl, $R^2$ is $C_1$-$C_6$ alkoxy, halide, amino, carboxyl or a mixture of any of the foregoing and n is 1 or 2, or an oligomer of said compound.

3. A composition as defined in claim 2 wherein said silane comprises an alkylalkoxysilane.

4. A composition as defined in claim 3 wherein said silane comprises an alkyltrialkoxysilane.

5. A composition as defined in claim 2 wherein $R^1$ comprises a $C_1$-$C_{10}$ alkyl group, $R^2$ comprises a $C_1$-$C_3$ alkoxy group and n is 1.

6. A composition as defined in claim 2 wherein the concentration of said silane (a) comprises from about 2.5 to about 40 percent by weight of said composition.

7. A composition as defined in claim 1 wherein said hydrolyzable siloxane (a)(ii) comprises a compound of the general formula

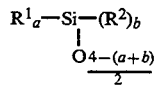

wherein $R^1$ is $C_1$-$C_{10}$ hydrocarbyl, $R^2$ is $C_1$-$C_3$ alkoxy, a is about 1, and b=0.2-2.

8. An aqueous emulsion composition comprising:

(a)(i) a hydrolyzable silane or a mixture of hydrolyzable silanes of the formula $R^1{}_1Si(R_2)_{4-n}$ wherein $R^1$ is a $C_1$-$C_{30}$ hydrocarbyl or halogenated hydrocarbyl group, $R^2$ is $C_1$-$C_6$ alkoxy, halide, amino, carboxyl, or a mixture of the foregoing and n is 1 or 2, (a)(ii) a hydrolyzable siloxane or mixture of hydrolyzable siloxanes of the formula

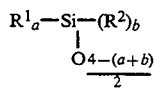

wherein $R^1$ and $R^2$ are as defined for (a)(i), a=0.8 to 2, and b≦2, or (a)(iii) a mixture of (a)(i) and (a)(ii), the total amount of (a)(i)+(a)(ii) in the composition being from about 0.5 to about 60 percent by weight;

(b) an organopolysiloxane resin selected from the group consisting of resins containing $R^3{}_3SiO_{0.5}$ units and $SiO_2$ units the ratio of $R^3{}_3SiO_{0.5}$ units to $SiO_2$ units ranging from about 0.2 to about 1.2:1, and resins containing $R^3{}_3SiO_{0.5}$ units, $R^3{}_2SiO$ units, and $SiO_2$ units, the ratio of $R^3{}_3SiO_{0.5}$ units to $SiO_2$ units ranging from about 0.2 to about 1.2:1 and the ratio of $R^3{}_2SiO$ units to $SiO_2$ units being up to about 0.1:1; where each $R^3$ is independently selected from the group consisting of a substituted or unsubstituted alkyl radical, an aryl radical, an alkaryl radical, an aralkyl radical, a cycloalkyl radical, an alkenyl radical and a mixture of any of the foregoing, the amount of the organopolysiloxane resin in the composition being from about 0.5 to about 45 percent by weight;

(c) A filler having a surface area of at least 40 $m^2/g$; the amount of filler in the composition is from about 0.01 to about 3 percent by weight;

(d) an emulsifier or mixture of emulsifiers;

(e) water; and (f) a small, effective amount of at least one compound for buffering the pH of said composition.

9. A composition as defined in claim 8 wherein said compound for buffering (f) comprises a mono- or polyalkali metal-, alkaline earth metal- or amine salt of carbonic acid, phosphoric acid, sulfuric acid, hydrosulfuric acid, a $C_1$-$C_6$ organo-, mono- or poly-carboxylic acid, or a $C_2$-$C_{30}$ alkyleneiminopolycarboxylic acid, ammonia, a $C_1$-$C_{30}$ organic base, or a mixture of any of the foregoing.

10. A composition as defined in claim 9 wherein said compound for buffering (f) comprises an alkali metal carbonate or -bicarbonate, or -phosphate or ammonia.

11. A composition as defined in claim 10 wherein said compound for buffering (f) comprises sodium bicarbonate.

12. A composition as defined in claim 8 wherein said buffering compound (f) provides a pH in the range of from about 6 to about 8.5.

13. A composition as defined in claim 1 which also includes:

(g) a small, effective amount of a biocide.

14. A composition as defined in claim 1 wherein said silane comprises octyltriethoxysilane.

15. A composition as defined in claim 1 wherein the amount of silane or siloxane (a) is from about 2.5 to about 40 percent by weight and the amount of organopolysiloxane resin (b) is from about 2.5 to about 30 percent by weight.

16. A composition as defined in claim 1 wherein said organopolysiloxane resin (b) consists of resins containing $R^3{}_3SiO_{0.5}$ units and $SiO_2$ units the ratio of $R^3{}_3SiO_{0.5}$ to $SiO_2$ units ranging from about 0.6 to about 1.0:1.

17. A composition as defined in claim 16 wherein said organopolysiloxane resin (b) consists of resins where $R^3$ is predominantly methyl.

18. A composition as defined in claim 1 wherein said filler (c) is a silica.

19. A composition as defined in claim 18 wherein said silica is a colloidal silica.

20. A composition as defined in claim 19 wherein said colloidal silica is an aqueous colloidal dispersion of silica particles.

21. A composition as defined in claim 1 wherein the concentration of said emulsifier or mixture of emulsifiers (d) is from about 0.1 to about 10 percent by weight of the composition.

22. A composition as defined in claim 1 wherein said emulsifier (d) has an HLB value of from about 4 to about 17.

23. A composition as defined in claim 1 wherein said emulsifier (d) comprises at least one nonionic emulsifying agent.

* * * * *